United States Patent Office 3,646,016
Patented Feb. 29, 1972

3,646,016
NOVEL NITROIMIDAZOLE HYDRAZONE
DERIVATIVES
David W. Henry, Menlo Park, Calif., and Dale R. Hoff,
Cranford, N.J., assignors to Merck & Co., Inc., Rahway,
N.J.
No Drawing. Application Feb. 4, 1965, Ser. No. 430,250,
now Patent No. 3,472,864, dated Oct. 7, 1969, which is
a continuation-in-part of application Ser. No. 352,966,
Mar. 18, 1964. Divided and this application Oct. 25,
1968, Ser. No. 794,814
Int. Cl. C07d 49/36
U.S. Cl. 260—240 G
7 Claims

ABSTRACT OF THE DISCLOSURE

Novel imidazole hydrazones are provided which are active against the protozoal diseases trichomoniasis, enterohepatitis, and amebiasis, as well as PPLO organisms and certain bacteria.

STATUS OF APPLICATION

This application is a divisional application of our copending United States application, Ser. No. 430,250 filed Feb. 4, 1965 now U.S. Pat. 3,472,864 which in turn is a continuation-in-part application of United States Ser. No. 352,966 filed Mar. 18, 1964 now abandoned.

This invention relates to 1-substituted-5-nitroimidazoles having a carbonyl function at the 2-position of the imidazole ring. More particularly, it relates to a 1-substituted-5-nitroimidazoles substituted at the 2-position by an aldehyde, lower alkanoyl or aroyl radical. It relates also to methods of making these new and novel substances. The invention also is concerned with derivatives of such 2-formyl, 2-lower alkanoyl and 2-aroyl 1-substituted-5-nitroimidazoles, and particularly with derivatives of the oxime, hydrazone and semicarbazone type, and with the chemical synthesis thereof. The invention relates further to the use of these novel substances as antiprotozoal and antibacterial agents.

The 2-substituted-5-nitroimidazoles of this invention have the following structural formula:

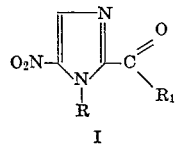

I

In this formula R represents loweralkyl, and preferably methyl, or the oxyalkyl radical —$(OH_2)_nOY$, where $n$ is a whole integer having a value of 2–4 inclusive and Y is hydrogen or acyl. When Y is acyl it is preferably lower alkanoyl, benzoyl or p-toluenesulfonyl. $A_1$ in Formula I represents hydrogen, loweralkyl or aryl such as methyl, ethyl, propyl or phenyl. $R_1$ is hydrogen or methyl in the preferred compounds of the invention.

According to the present invention the 2-formyl compounds of Formula I above, i.e. where $R_1$ is hydrogen, are obtained by oxidation of a 1-R-5-nitroimidazole having an oxidizable substituent at the 2-position. When a hydroxyalkyl group is present at the 1-position of the nitroimidazole starting material, it is preferred to esterify it prior to the oxidation to avoid undesired side reactions. This is accomplished by converting it by known methods to an acyloxyalkyl substituent such as 2-acetoxyethyl, 3-acetoxypropyl, 2-p-toluenesulfonyloxyethyl and the like. The choice of oxidizing agent is critical only to the extent that it should produce an aldehyde group at the 2-position of the imidazole ring. Several oxidants are suitable, the ones of choice depending primarily on the substituent which is to be oxidized to the aldehyde (formyl) group.

According to one process, the new 1-R-2-formyl-5-nitroimidazole compounds are obtained by treating an appropriate 1 - substituted-2-($\beta$-phenylvinyl)-5-nitroimidazole with an oxidizing system comprising an alkali metal periodate and osmium tetroxide. When the reaction is carried out on a 1-loweralkyl-2-($\beta$-phenylvinyl)-5-nitroimidazole, such as the 1-methyl, 1-ethyl and 1-propyl compounds, the alkyl group at the 1-position is not affected during the course of the reaction and the corresponding 1-loweralkyl-2-formyl-5-nitroimidazole is produced directly. On the other hand, to obtain a 1-$(CH_2)_nOY$-substituted-2-formyl-5-nitroimidazole where $n$ has the above meaning and Y is hydrogen, it is necessary, as previously mentioned, to convert the 1-hydroxyalkyl substituent to an acyloxyalkyl substituent in order to prevent undesired oxidation. Thus, 1-(2-hydroxyethyl)-2-formyl-5-nitroimidazole is obtained by the alkali metal periodate-osmium tetroxide oxidation of 1-(2-acetoxyethyl)-2-($\beta$-phenylvinyl)-5-nitroimidazole, and subsequent acid hydrolysis of the resulting 1-(2-acetoxyethyl)-2-formyl-5-nitroimidazole.

This oxidative process is conveniently brought about at temperatures of from about 20–35° C. The reaction time is not unduly critical and it has been found that at the foregoing temperature the reaction is substantially complete in from 10–20 hours. We prefer to carry out the process in a suitable aqueous solvent medium, a preferred example of which is water-1,2-dimethoxyethane. It is, of course, necessary that the particular organic solvent be one which is resistant to oxidation. We prefer to employ an excess of the alkali metal periodate, such as sodium periodate, and good results are obtained by using from 2.0–2.5 moles of periodate per mole of nitroimidazole reactant. Only catalytic amounts of osmium tetroxide are required and from 1–3 mole percent are satisfactory. At the end of the oxidation reaction, the desired 1-substituted-2-formyl-5-nitroimidazole may be separated and isolated by methods that would be known to those skilled in this art.

In accordance with a second embodiment of the oxidation process described herein, 1-R-2-formyl-5-nitroimidazole, R being loweralkyl or acyloxyalkyl as previously defined, is obtained by oxidation of 1-R-2-hydroxymethyl-5-nitroimidazole with an oxidant such as lead tetraacetate, manganese dioxide, nitrogen tetroxide, dimethylsulfoxide-dicyclohexyl carbodiimide, nitric acid or pyridinechromium trioxide complex or with other reagents capable of converting the 2-hydroxymethyl substituent to a 2-formyl radical. These processes are preferably carried out in organic solvents inert under the reaction conditions, using a slight excess of oxidizing agent for best results. A large excess of oxidant is normally avoided in order to minimize over-oxidation of the desired aldehyde. With lead tetraacetate or manganese dioxide, solvents such as benzene, toluene or xylene are very satisfactory and are preferred. Good results are obtained by heating the reaction mixture at temperature of about 60–120° C. for 2–12 hours, and preferably 4–10 hours. The insoluble metal salts are separated by filtration, centrifugation or decantation, and the desired 1-R-2-formyl-5-nitroimidazole recovered from the reaction solution and purified by techniques familiar to those in the art, such as extraction into an immiscible solvent, chromatography over alumina or silica gel and crystallization. In this way the following compounds are obtained from the corresponding 2-hydroxymethyl imidazoles: 1-ethyl-2-formyl-5-nitroimidazole, 1-propyl-2-formyl-5-nitroimidazole, 1-(2-propionoxyethyl)-2-formyl-5-nitroimidazole, 1-(3-acetoxypropyl)-2-formyl-5-nitroimidazole, and 1-(2-benzoyloxyethyl)-2-formyl-5-nitroimidazole. The 1-(acyloxyalkyl)-2-formyl-5-nitroimidazole compounds obtained in this way are converted to the corresponding 1-(hydroxyalkyl) compounds by acid hydrolysis of the ester, as with dilute sulfuric or hydrochloric acid.

When nitrogen tetroxide ($N_2O_4$) is employed as oxidizing agent, satisfactory results are achieved by conducting the reaction at room temperature or slightly above, i.e. up to about 45° C. in solvents such as chloroform, methylene dichloride, tetrachlorethane or dimethylsulfone, and the resulting 1–R–2-formyl-5-nitroimidazole recovered by removal of solvent followed by extraction into aqueous base and finally into a water-immiscible solvent such as ether. With all of these 2-formyl imidazoles, recovery may include the conversion to a relatively insoluble derivative such as a semicarbazone or dinitrophenyl hydrazone, and subsequent regeneration of aldehyde.

In still another aspect of the invention, the 1,5-disubstituted-2-hydroxymethyl imidazole is oxidized to the aldehyde by contacting it with dimethylsulfoxide and dicyclohexylcarbodiimide. This reaction is normally carried out in the presence of an acid such as orthophosphoric acid. Reaction times of 15–30 hours at room temperature are suitable, and these may be reduced when using elevated temperatures of 40–80° C. Dicyclohexylurea is formed during the oxidation and is removed by filtration after diluting the mixture with water upon completion of the reaction. The 2-formyl imidazole is likewise obtained by treatment of a sulfonate ester of 1-loweralkyl-2-hydroxymethyl-5-nitroimidazole, such as the 2-methanesulfonate or p-toluenesulfonate ester, with dimethyl sulfoxide.

According to a further embodiment of the invention, the 1-substituted-2-formyl-5-nitroimidazole is obtained by oxidation of the corresponding 2-methyl imidazole with selenium dioxide. This reaction may be brought about by contacting the 1–R–2-methyl-5-nitroimidazole reactant, where R is loweralkyl or acyloxyalkyl, with selenium dioxide, and heating the mixture until reaction begins, as indicated by evolution of heat. On conclusion of the exothermic reaction the mixture is cooled, and the imidazoles separated by extraction into an organic solvent. Final purification of the 1–R–2-formyl-5-nitroimidazole may be facilitated by formation of an insoluble aldehyde derivative such as an oxime, hydrazone or semicarbazone.

The nitroimidazoles of Formula I above where R is as previously defined and $R_1$ in loweralkyl or aryl are produced from the corresponding 2-formyl imidazoles by reacting such 2-formyl imidazole with a Grignard reagent to produce an intermediate alcohol of the formula

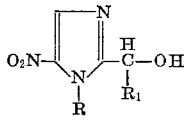

and then oxidizing this alcohol to the desired ketone. As will be understood by those familiar with this art, the nature of $R_1$ (i.e. loweralkyl or aryl) depends directly on the hydrocarbon radical of the Grignard reagent employed. When the Grignard reagent is methyl magnesium halide, ethyl magnesium halide, propyl magnesium halide and phenyl magnesium halide, this synthesis affords the 2-acetyl, 2-propionyl, 2-butyryl and 2-benzoyl imidazoles, respectively. Oxidation of the alcohol produced via the Grignard reaction to the ketone is conveniently accomplished with oxidizing agents such as chromium trioxide. When a hydroxyloweralkyl substituent is present at the 1-position of the imidazole ring, it is blocked by esterification during this process in order to prevent its oxidation. This "blocking" is via formation of a lower alkanoyl, benzoyl or sulfonyl ester, which is readily removed by hydrolysis after formation of the 2-alkanoyl or 2-benzoyl substituent. Examples of compounds produced in this way from the corresponding 2-formyl imidazole and Grignard reagent of the formula R′MgX, where R′ is alkyl or aryl and X is halo, are 1-methyl-2-acetyl-5-nitroimidazole, 1-(2-acetoxyethyl)-2-acetyl-5-nitroimidazole, 1-(3-benzoyloxypropyl)-2-acetyl-5-nitroimidazole, 1-methyl-2-propionyl-5-nitroimidazole, 1-ethyl-2-butyryl-5-nitroimidazole, 1-methyl-2-benzoyl-5-nitroimidazole and 1-(2-acetoxyethyl)-2-benzoyl-5-nitroimidazole. The 1-(acyloxyalkyl) compounds are converted to the 1-(hydroxyalkyl) imidazoles by hydrolysis with dilute mineral acid.

The 1–R–2-lower alkanoyl-5-nitroimidazoles of the invention, where R is as in Formula I above, may also be produced from the corresponding 2-formyl imidazoles by treating these latter substances with a diazoloweralkane. The reaction is carried out by contacting the aldehyde with an excess of diazoalkane in an inert organic solvent such as ether, tetrahydrofuran, dimethoxyethane, diglyme or benzene. It proceeds satisfactorily at room temperature and is substantially complete in from ½–3 hours.

In addition to the aldehydes and ketones of Formula I above, this invention embraces derivatives of such substances formed by reaction between the carbonyl function of the aldehyde or ketone and substances having a reactive —$NH_2$ group. Such derivatives may be classified generically as oximes, hydrozones and semicarbozones, this characterization including substituted and complex oximes, hydrazones and semicarbazones in addition to the relatively simple ones sometimes used in the identification and/or characterization of aldehydes and ketones.

The compounds of our invention obtained by reaction of our novel 2-formyl, 2-lower alkanoyl or 2-aroyl-5-nitroimidazoles with hydroxylamine or alkoxylamine may be represented by the structural formula

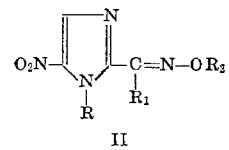

II where R is a loweralkyl or —$(CH_2)_nOY$, $n$ is a whole integer having a value of 2–4 inclusive and Y is hydrogen or acyl, the acyl radical preferably being lower alkanoyl, benzoyl or p-toluenesulfonyl, $R_1$ above is hydrogen; loweralkyl (preferably methyl) or aryl (preferably phenyl) and $R_2$ represents hydrogen or lower alkyl. When $R_1$ is hydrogen these substances may be described as aldoximes, although in the description the products of Formula II are referred to generally as oximes. They are produced by reacting together a 2-formyl, 2-loweralkanoyl or 2-benzoyl imidazole of Formula I above with hydroxyamine ($R_2$=H) or alkoxylamine ($R_2$=loweralkyl). These reagents are normally used in the form of acid addition salts, with the hydrohalide salts, and in particular the hydrochloride, being preferred. An excess of hydroxyl- or alkoxylamine is employed for best results, from about 5–20% excess being quite satisfactory in most cases. A solvent medium such as water and/or a lower alkanol is preferably used since this permits better control of the reaction. Formation of the desired oxime takes place rapidly, and is substantially complete in from 5–30 minutes at temperatures in the range of 40–85° C. The resulting imidazole oximes precipitate or crystallize readily at room temperature and are recovered by known techniques.

Examples of this class of compounds (of Formula II above) provided by this invention are 1-ethyl-2-formyl-5-nitroimidazole oxime; 1-(2-hydroxyethyl)-2-formyl-5-nitroimidazole methoxime (from 1-(2-hydroxyethyl)-2-formyl-5-nitroimidazole and methoxyamine hydrochloride); 1-methyl-2-acetyl-5-nitromidazole ethoxime (from 1-methyl-2-acetyl-5-nitroimidazole and ethoxylamine hydrochloride); 1-methyl-2-acetyl-5-nitroimidazole oxime (from 1-methyl-2-acetyl-5-nitroimidazole and hydroxylamine hydrochloride); 1 - methyl-2-benzoyl-5-nitroimidazole methoxime (from 1-methyl-2-benzoyl-5-nitroimidazole and methoxylamine hydrochloride; 1-(2-hydroxyethyl)-2-formyl-5-nitroimidazole oxime; and the oxime obtained from 1 - methyl-2-formyl - 5 - nitroimidazole and aminooxyacetic acid.

A further group of imidazole-2-aldehyde, 2-alkanoyl and 2-benzoyl carbonyl derivatives provided by the present invention are those of the hydrazone type, having the following formula

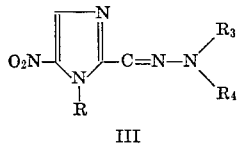

III where R and R₁ have the same meaning as in Formulas I and II above. The moiety

may be a 5- or 6-membered saturated heterocyclic ring in which the nitrogen is in the ring, while R₃ and R₄ together represent the remainder of the ring. Examples of compounds of this type are those where —NR₃R₄ represents a morpholinyl, thiamorpholinyl, piperidyl, piperazinyl, oxazolidinyl or imidazolidinyl ring, which rings may be substituted as with alkyl, hydroxyalkyl or keto radicals. Those compounds where —NR₃R₄ is a 2-oxooxazolidinyl or 2-oxoimidazolidinyl moiety represent preferred embodiments of this aspect of the invention.

Alternatively in the

group of Formula III above, R₃ may be hydrogen or lower alkanoyl, while R₄ is loweralkyl, aryl, heteroaryl, acyl carboalkoxy or amidoalkyl. More specific examples of R₄ are loweralkyl groups such as methyl, ethyl, propyl and hexyl, aryl radicals such as phenyl, substituted phenyl and naphthyl, heteroaryl groups such a pyridyl, picolinyl, thiazolyl, furyl and thienyl, lower alkanoyl of which acetyl, propionyl and butyryl are illustrative, benzoyl and substituted benzoyl, and heteroaroyl such as furoyl, thenoyl, pyrazinoyl, thiazole carbonyl, imidazole carbonyl and the like.

It will be appreciated that all of these have the

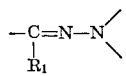

moiety characteristic of hydrazones, where R, R₁, and —NR₃R₄ taken together, and R₃ and R₄ separately, have the same meaning as defined above. The reaction is a rapid one, and is essentially complete in from 5–60 minutes at temperatures of about 50–90° C. It is preferred to use a moderate excess of the amine reactant, from 3–25% excess being satisfactory, and to carry out the reaction in a solvent such as lower alkanol or an aqueous alkanol in the presence of a catalytic amount of mineral acid.

Representative examples of hydrazone compounds embraced within this embodiment of our invention are 1-(2-hydroxyethyl)-2-formyl-5-nitroimidazole 1-amino-4-(2-hydroxyethyl)-piperazine hydrazone,
1-methyl-2-formyl-5-nitroimidazole 1-amino-piperazine hydrazone,
1-methyl-2-acetyl-5-nitroimidazole N-aminomorpholine hydrazone,
1-methyl-2-benzoyl-5-nitroimidazole phenylhydrazone,
1-(2-hydroxyethyl)-2-(1-piperidyliminomethyl)-5-nitroimidazole,
1-methyl-2-acetyl-5-nitroimidazole 2,4-dinitrophenylhydrazone,
2-[1-(2-hydroxyethyl)-5-nitro-2-imidazolylmethylene] hydrazinoacetamide,
3-[(1-(2-hydroxyethyl)-5-nitro-2-imidazolylmethylene)-amino]-2-oxazolidinone,
3-[(1-(2-hydroxyethyl)-5-nitro-2-imidazolylmethylene)-amino]-2,5-imidazolidinedione and
3-[(1-methyl-5-nitro-2-imidazolylmethylene)-amino]-2-imidazolidinethione,
ethyl-(1-methyl-5-nitro-2-imidazolylmethylene) carbazate.

A third type of aldehyde and ketone derivative within the scope of this invention are those which may be grouped generally as semicarbazones. These have the structural formula

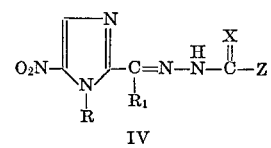

IV where R and R₁ have the same meaning as in Formula I, X is oxygen, sulfur or =NH, and Z represents amino, alkylamino or arylamino, and preferably amino or loweralkylamino such as methylamino or ethylamino. These semicarbazones are obtained by the reaction of an imidazole of the structure

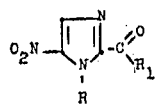

where R and R₁ are as previously defined with a semicarbazide having the formula

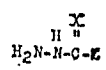

where X and Z mean the same as in Formula IV. The conditions of the reaction are essentially the same as those used in making the hydrazones of Formula III. The semicarbazones are generally quite insoluble in the reaction medium and are thus readily recovered in substantially pure form. Representative examples of this class of new and novel compounds that might be mentioned are 1-(2-hydroxylethyl)-2-formyl-5-nitroimidazole semicarbazone,
1-methyl-2-propionyl-5-nitroimidazole semicarbazone,
1-(2-hydroxyethyl)-2-formyl-5-nitroimidazole 4'-methylsemicarbazone,
1-methyl-2-benzoyl-5-nitroimidazole thiosemicarbazone,
1-(2-hydroxyethyl)-2-formyl-5-nitroimidazole thiosemicarbazone,
1-methyl-2-formyl-5-nitroimidazole guanyl hydrazone,
1-ethyl-2-formyl-5-nitroimidazole thiosemicarbazone, and
1-methyl-2-formyl-5-nitroimidazole 4'-phenylthiosemicarbazone.

In addition to the new and novel compounds described hereinabove, there is provided in accordance with an additional embodiment of the invention the cyclic ketone of the structure

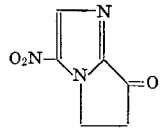

and the oxime, hydrazine and semicarbazone derivatives thereof. This is in effect a compound of Formula I above wherein R and R₁ of Formula I are methylene radicals. This substance, namely 3-nitro-7-oxo-5,6-dihydroimidazo-[1,2:a]-pyrrole, is prepared from a sulfonyloxy ester of 1-(2-hydroxyethyl) - 2 - methyl-5-nitroimidazole by a process that comprises conversion of this latter substance to 1,2 - trimethylene-5-nitroimidazole, then to 3-nitro-7-benzal - 5,6 - dihydroimidazo-[1,2:a]-pyrrole, and finally oxidation of the benzal to the cyclic ketone:

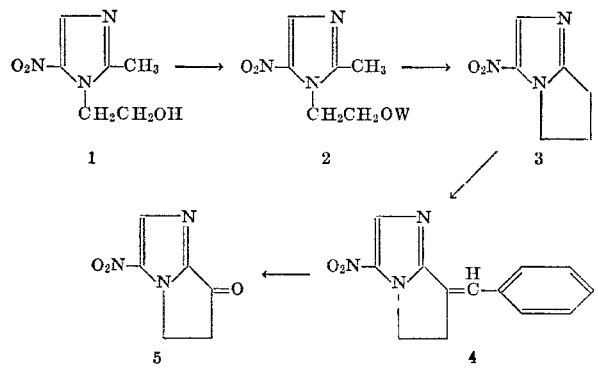

W in structure 2 above represents loweralkanesulfonyl or p-toluenesulfonyl. The initial ring closure is effected by reacting 1-(2-sulfonyloxyethyl)-2-methyl-5-nitroimidazole with an alkali metal alkoxide such as potassium t-butoxide, sodium isopropoxide or sodium ethoxide in an anhydrous alcoholic medium. Good results are obtained using equivalent molar quantities of reactants although a slight excess of alkoxide may be employed if desired. The trimethylene 5-nitroimidazole of structure 3 above is next reacted with benzaldehyde in the presence of an alkali metal alkoxide, such as one of those used in the previous reaction, to produce 3-nitro-7-benzal-5,6-dihydroimidazo-[1,2:a] pyrrole of Structure 4. Good results are obtained by conducting this reaction at an elevated temperature of between about 65–100° C. in an anhydrous alkanol, using an excess molar quantity of benzaldehyde and alkoxide. The ketone of Structure 5 is then obtained by oxidizing the benzal derivative with alkali metal periodate-osmium tetroxide. This ketone may be isolated and purified directly if desired. It is somewhat more satisfactory, however, to effect the final purification via formation of an insoluble ketone derivative, such as an oxime, semicarbazone or hydrazone.

The new and novel 1–R–2–formyl-5-nitroimidazoles and 1–R–2–loweralkanoyl and 2-benzoyl-5-nitroimidazoles of this invention, where R is as previously defined, and the oxime, hydrazone and semicarbazone derivatives thereof described hereinabove are useful in the control of disease in humans and animals. They are active against the protozoal diseases trichomoniasis, enterohepatitis and amoebiasis, and also against the PPLO organisms and certain bacteria. It will, of course, be appreciated that our compounds differ in degree of activity against these various afflictions.

Enterohepatitis, also known as histomoniasis and turkey blackhead, is caused by the protozoan parasite *Histomonas meleagridis*, and its occurrence is a serious problem in the turkey-raising industry. Compounds of this invention are effective in the prevention and treatment of enterohepatitis, and when used for this purpose are administered to turkeys susceptible to the disease mixed with an element of turkey sustenance, i.e. the feed or the drinking water of the birds. The optimum dose level will vary with the particular compound used, the severity of the infection and age of the birds to be treated. With the preferred compounds of the invention, good control of the infection is obtained by adding the drug to the feed at levels of about 0.0075% to about 0.075% by weight. Somewhat higher levels may be used when the drug is administered via the drinking water, i.e. up to about 0.2% by weight of the water. Examples of compounds particularly useful against enterohepatitis are the 1-methyl, and 1-(2-hydroxyethyl)-2-formyl-5-nitroimidazole semicarbazones and thiosemicarbazones, and 3-[(1-methyl-5-nitro-2-imidazolylmethylene)-amino]-2-oxazolidinone.

The imidazoles of this invention are also useful against trichomoniasis, a protozoan disease caused by species of the genus Trichomonas. A particularly troublesome form of trichomoniasis against which our compounds are active is caused by infestation of the vagina with *T. vaginalis*, and is known as *T. vaginalis vaginitis*. Our novel compounds may be used orally or topically as antitrichomonal agents. For oral administration they are normally compounded in a pharmaceutical unit dosage form such as a tablet or capsule. Such unit dosage forms containing from about 50 to about 500 mg. of active antitrichomonal ingredient are quite satisfactory and are prepared by techniques known to those skilled in the pharmaceutical art. Thus, these unit dosage forms will contain the normal diluents, excipients, lubricating agents and extenders regularly employed in compounding such forms. When used as oral antitrichomonal agents, it is generally preferred to administer these imidazoles at daily dose levels of about 50–750 mg.

Alternatively, the drugs may be suspended or dissolved in liquid vehicles designed for oral administration. The final preparation may be in the form of a solution, emulsion, suspension, syrup or the like and may be adapted for ultimate use by known methods with conventional excipients, diluents, wetting agents or other additives. For topical administration, topical jellies, creams, ointments or suppositiories are normally employed.

Examples of the 5-nitroimidazoles of the invention that are particularly effective as antitrichomonal agents are 1-methyl - 2-formyl-5-nitroimidazole, 1-(2-hydroxyethyl)-2-formyl - 5 - nitroimidazole, 1-methyl-2-acetyl-5-nitroimidazole, 1-methyl-2-formyl-5-nitroimidazole thiosemicarbazone and 4′-methylthiosemicarbazone, 1-methyl-2-formyl-5 - nitroimidazole - N (O-methyl) oxime, 3-[(1-methyl-5-nitro - 2 - imidazolylmethylene)-amino]-2-oxazolidinone, and 1 - methyl - 2 - formyl-5-nitroimidazole N-acetylhydrazone.

The 5-nitroimidazoles described herein also demonstrate activity against bacteria, and especially against species of Salmonella and Streptococci, and are further effective against the so-called PPLO (pleuro-pneumonia like organisms).

The following examples are given for the purpose of illustration and not by way of limitation.

Example 1

40 gm. of 1-methyl-2-(β-phenylvinyl)-5-nitroimidazole and 80 gm. of sodium periodate are added to a mixture of 800 ml. of 1,2-dimethoxyethane and 200 ml. of water at room temperature. 1 gm. of osmium tetroxide is then added and the mixture stirred for 17 hours at room temperature. The pale yellow reaction mixture which contains a heavy white precipitate is poured into 6 l. of water and the entire mixture extracted with three 1300 ml. portions of chloroform. The chloroform extracts are combined, dried over sodium sulfate and then concentrated to dryness in vacuo to a brown oil. This oil crystallizes on cooling. The resulting crystalline residue is extracted with four 200 ml. portions of hot ethyl ether. The ether extracts are combined and diluted with an equal volume of hexane. The resulting solution is chromatographed over a column of 350 gm. of acid washed alumina prepared in 1:1 ether-hexane. The column is eluted with 1:1 ether-hexane to remove a colorless fraction containing 8.2 gm. of an oil having the odor of benzaldehyde. The column is then eluted with about 1.5 l. of ether and this eluate concentrated to a volume of about 350 ml. It is allowed to stand at room temperature for about 12 hours during which time about 4.1 gm. of 1-methyl-2-formyl-5-nitroimidazole crystallizes. The product is recovered by filtration and dried, M.P. 95–98° C.

Example 2

2 gm. of 1-(2-hydroxyethyl)-2-(β-phenylvinyl)-5-nitroimidazole is mixed with 1.2 gm. of acetic anhydride in 10 ml. of pyridine at room temperature for four hours. The mixture is then diluted with 100 ml. of water and adjusted to pH 2 with concentrated hydrochloric acid. It is filtered and the recovered crystals of 1-(2-acetoxyethyl)-2 - (β - phenylvinyl)-5-nitroimidazole washed thoroughly with water. The crystals are then air dried.

The crystalline product obtained as described above is added to a mixture of 40 ml. of dimethoxyethane, 10 ml. of water and 3.6 gm. of sodium periodate. 50 mg. of osmium tetroxide are added and the reaction allowed to stand for about 15 hours at room temperature. It is then diluted with 100 ml. of water and extracted with two 100 ml. portions of chloroform. The chloroform extracts are combined, dried over sodium sulfate and then evaporated to dryness in vacuo to an oily residue of the crude 1-(2-acetoxyethyl)-2-formyl-5-nitroimidazole.

This crude material is added to a mixture of 10 ml. of methanol and 10 ml. of 4 N hydrochloric acid. This mixture is refluxed for one hour and then cooled. The methanol is removed by distillation in vacuo. The remaining aqueous mixture is brought to pH 1.5 with 2 N aqueous ammonium hydroxide. It is then extracted with three 20 ml. portions of ethyl acetate. The ethyl acetate extracts are combined and evaporated to dryness in vacuo to leave a residue of 1 - (2 - hydroxyethyl)-2-formyl-5-nitroimidazole. This is purified by trituration with hexane and chromatography of the solid material over acid washed alumina, using ethyl acetate as a solvent.

The starting materials for Examples 1 and 2 are prepared in the following manner:

(A) 5 gm. of 1,2-dimethyl-5-nitroimidazole (0.035 m.) and 18 ml. of benzaldehyde (0.18 m.) are added to a mixture of 90 ml. of absolute ethanol and 6 gm. of potassium t-butoxide (0.054 m.). The resulting mixture is heated at 70–75° C. in a water bath for 20 minutes. It is then cooled in an ice bath and the solid precipitate of 1-methyl-2-(β-phenylvinyl)-5-nitroimidazole removed by filtration. The solid is washed first with ethanol and then with water. The remaining crystalline product is 1-methyl-2-(β-phenylvinyl)-5-nitroimidazole, M.P. 198–199° C. after air drying.

(B) 1.0 gm. of 1-(2-hydroxyethyl)-2-methyl-5-nitroimidazole, 1 ml. of benzaldehyde and 500 mg. of sodium methoxide are dissolved in 20 ml. of ethanol and the mixture warmed to 70° C. for 25 minutes. The mixture is then cooled to room temperature and an equal volume of water is added. The resulting precipitated 1-(2-hydroxyethyl) - 2 - (β-phenylvinyl)-5-nitroimidazole is collected by filtration and air dried. It is recrystallized from ether and then from ethyl acetate to give substantially pure material, M.P. 156–158° C.

Example 3

1-(2-hydroxyethyl) - 2 - formyl-5-nitroimidazole.—2.3 gm. (10 mmol) of 1-(2-acetoxyethyl)-2-hydroxymethyl-5-nitroimidazole is stirred for 8 hours at 78° C. with 7.2 gm. of lead tetraacetate in 60 ml. of benzene. The solution is then cooled and filtered to remove precipitated lead diacetate. The benzene filtrate is extracted twice with 20 ml. portions of saturated aqueous potassium bicarbonate solution. The benzene solution is then evaporated to dryness in vacuo. The residue of crude 1-(2-acetoxyethyl)-2-formyl-5-nitroimidazole is dissolved in 15 ml. of 10% sulfuric acid and the solution heated at 100° C. for one hour. It is then cooled and neutralized with solid sodium bicarbonate, and extracted with 3× 20 ml. portions of ethyl acetate. The ethyl acetate extracts are combined, dried over sodium sulfate, and then evaporated in vacuo to dryness to leave substantially pure 1-(2-hydroxyethyl)-2-formyl-5-nitroimidazole.

Example 4

1-methyl-2-formyl-5-nitroimidazole.—100 gm. (0.64 m.) of 1-methyl-2-hydroxymethyl-5-nitroimidazole is dissolved in 3500 ml. of benzene at 70° C. There is added over a 20 minute period 460 gm. of lead tetraacetate (previously washed with glacial acetic acid and air dried in the dark). The reaction mixture is stirred at 78° C. for 8 hours during which time white, crystalline lead diacetate precipitates from the solution. The mixture is allowed to stand overnight at room temperature, and the lead diacetate then removed by filtration and washed with 2× 100 ml. of benzene. The combined benzene filtrate and washes are extracted with two 1 liter portions of saturated aqueous potassium bicarbonate, then with 1500 ml. of water. The aqueous extracts are combined and extracted with 3× 2500 ml. portions of chloroform. The chloroform extracts are backwashed individually with 500 ml. of water and then combined with the benzene solution and evaporated in vacuo to dryness. The residue is dissolved in 500 ml. of 10% sulfuric acid and warmed on the steam cone at 75–90° C. for 35 minutes.

The acidic solution is then cooled to room temperature and neutralized with sodium bicarbonate. This aqueous solution is then extracted with 4× 2500 ml. portions of chloroform and each extract is backwashed in turn with 500 ml. of water. The organic extracts are combined and evaporated to dryness, in vacuo. The crystalline residue thus obtained is dissolved in a minimum volume of chloroform and filtered over about 250 gm. of silica gel. The silica gel is eluted with 7500 ml. of methylene dichloride. The eluate is evaporated in vacuo to give a residue of substantially pure 1-methyl-2-formyl-5-nitroimidazole. Recrystallization of the product from 500 ml. of boiling hexane affords 79 gm. of 1-methyl-3-formyl-5-nitroimidazole, M.P. 90–94° C.

Example 5

1 - methyl - 2 - formyl - 5 - nitroimidazole.—157 mg. (1 mmol) of 1-methyl-2-hydroxymethyl-5-nitroimidazole and 348 mg. of activated manganese dioxide are refluxed together for 2 hours in 5 ml. of benzene. The manganese dioxide is removed by centrifuging and washed three times with 5 ml. of boiling benzene. The combined benzene supernatant and washes are dissolved in ether and filtered through 1.0 gm. of acid washed alumina. The ether eluate is evaporated in vacuo to give 41 mg. of crystalline 1-methyl-2-formyl-5-nitroimidazole.

Example 6

312 mg. of 1-methyl-2-hydroxymethyl-5-nitroimidazole is dissolved in 10 ml. of chloroform. 1.0 gm. of di-nitrogen tetroxide is added and the resulting suspension stirred at room temperature for 5 days. The mixture is then evaporated to dryness in vacuo, and the residue dissolved in 10 ml. of saturated aqueous potassium bicarbonate. The aqueous solution is extracted with 5× 25 ml. of ether. The ether extracts are combined, backwashed with 10 ml. of water, dried over sodium sulfate, and finally evaporated in vacuo to a residue of 1-methyl-2-formyl-5-nitroimidazole.

The product is purified by dissolving in 2 ml. of ethanol and adding 300 mg. of semicarbazide hydrochloride in 3 ml. of hot water. The solution is cooled to room temperature and the precipitate of 1-methyl-2-formyl-5-nitroimidazole semicarbazone recovered by filtration and dried, M.P. 251–253° C.

Example 7

1-methyl-2-formyl-5-nitroimidazole.—0.156 gm. (1 mmol) of 1-methyl-2-hydroxymethyl-5-nitroimidazole is dissolved in 1.3 ml. of dimethylsulfoxide. To this solution 0.412 gm. (2 mmol) of dicyclohexyl carbodiimide in 3.3 ml. of dimethyl sulfoxide is added with stirring. Finally, 0.05 gm. (0.5 mmol) of ortho-phosphoric acid in 0.4 ml. of dimethylsulfoxide is added with stirring, and the reaction mixture stirred for 29 hours at room temperature. The mixture is then diluted with 20 ml. of water and filtered to remove dicyclohexylurea. The solid is washed with five 1 ml. portions of water. The combined filtrate and washes are extracted with four 50 ml. portions of ether. The ether extracts are then combined and backwashed with 10 ml. of water. The ethereal solution is dried over sodium sulfate, and evaporated to dryness in vacuo.

The material thus obtained is a mixture of unreacted 1-methyl-2-hydroxymethyl-5-nitroimidazole and 1-methyl-2-formyl-5-nitroimidazole. It is dissolved in 1 ml. of hot ethanol and treated with 100 mg. of semicarbazide hydrochloride in 1 ml. of water. The mixture is cooled to room temperature. 8 mg. of 1-methyl-2-formyl-5-nitroimidazole semicarbazone precipitates. It is recovered by filtration and dried, M.P. 250–254° C.

Example 8

1-methyl-2-formyl-5 - nitroimidazole.—1.41 gm. (10 mmol) of 1,2-dimethyl-5-nitroimidazole and 1.11 gm. (10 mmol) of selenium dioxide are mixed and heated to about 140° C. without a solvent until reaction starts. A vigorous exothermic reaction ensues, and heat is removed by ice-bath cooling. The mixture is then cooled to room temperature and extracted with 150 ml. of methylene dichloride. The extracts are evaporated in vacuo to a crystalline residue. This crude material is dissolved in 2.5 N hydrochloric acid and the acidic solution washed with ether. The aqueous phase is then neutralized to pH 5 and extracted with ether. The ether extract is concentrated to a crystalline residue (A). The aqueous phase is then made alkaline and re-extracted with ether. This ether extract is evaporated to dryness to give a residue (B). The solid fractions A and B are combined and dissolved in 4–5 ml. of ethanol. The ethanol solution is mixed with excess hydroxylamine hydrochloride in a small volume of water. The resulting mixture is heated to 100° C., then promptly cooled to about 15–20° C. 1-methyl-2-formyl-5-nitroimidazole oxime precipitates and is collected by filtration.

Example 9

1-methyl-2 - acetyl - 5 - nitroimidazole.—1 gm. (6.45 mmol) of 1-methyl-2-formyl-5-nitroimidazole is dissolved in 50 ml. of ether and the solution cooled to 0° C. To this cold solution there is added dropwise with stirring 410 mg. (9.6 mmol) of diazomethane in 30 ml. of ether. Addition of the diazomethane requires about 15 minutes. At the end of this time the mixture is stirred for 90 minutes and then filtered, and the filtrate concentrated to dryness in vacuo. The residue is dissolved in 50 ml. of ether and the solution filtered through 8 gm. of acid washed alumina. The filtrate is collected and the solvent removed by concentration in vacuo. The residue of 1-methyl-2-acetyl-5-nitroimidazole thus obtained is recrystallized from hexane to give substantially pure material, M.P. 105–107° C.

Example 10

1-methyl-2-formyl-5-nitroimidazole oxime.—100 mg. of 1-methyl-2-formyl-5-nitroimidazole (0.645 mmol) and 50 mg. of hydroxylamine hydrochloride (0.72 mmol) are heated together on a steam bath for 3 minutes in 1.5 ml. of ethanol containing 1 drop of pyridine. About 0.3 ml. of water is added to the excess hydroxylamine hydrochloride in solution. Crystals form, and the suspension is cooled and filtered. The solid product is washed with ethanol and dried to give 94 mg. of 1-methyl-2-formyl-5-nitroimidazole oxime. It is recrystallized twice from ethanol to give pure product, M.P. 255–260° C. (dec.).

Example 11

1-methyl-2-formyl-5-nitroimidazole methoxime.—0.645 mmol of 1-methyl-2-formyl-5-nitroimidazole is dissolved in 0.7 ml. of warm ethanol, and to this solution there is added with stirring 0.71 mmol of methoxyamine hydrochloride in 0.2 ml. of water. The mixture is stirred thoroughly and then allowed to stand for 10 minutes. It is cooled to room temperature and the insoluble 1-methyl-2-formyl-5-nitroimidazole methoxime removed by filtration. It is recrystallized from acetone-water to give substantially pure material as pale yellow crystals, M.P. 98–100° C.

Example 12

(A) 1.54 gm. of 1-methyl-2-formyl-5-nitroimidazole is dissolved in 8 ml. of hot ethanol. This solution is stirred while a solution of 1.6 gm. of 1-amino-4-(2-hydroxyethyl) piperazine in a minimum volume of 50% aqueous ethanol is added. 0.5 ml. of 2.5 N hydrochloric aicd is then added and the solution allowed to cool to room temperature. The reaction mixture is finally chilled in an ice bath. 1-methyl-2-formyl-5-nitroimidazole 1-amino-4-(β-hydroxyethyl) piperazine hydrazone crystallizes. It is removed by filtering, washed with 10 ml. of cold water and recrystallized from ethanol. 2.26 gm. of 1-methyl-2-formyl-5-nitroimidazole 1-amino-4-(β-hydroxyethyl) piperazine hydrazone are obtained, M.P. 153–155° C.

(B) When the process of Part A above is repeated using 0.81 gm. of N-acetylhydrazine instead of the piperazine, there is obtained 1-methyl-2-formyl-5-nitroimidazole N-acetyl hydrazone, M.P. 220–221° C.

(C) When the process of Part A is carried out with 1.12 gm. of N-aminomorpholine in place of the substituted piperazine, and in methylene dichloride solvent instead of ethanol, the hydrazone of 1-methyl-2-formyl-5-nitroimidazole and N-aminomorpholine is produced, M.P. 163–165° C.

Example 13

1-methyl-2-(3-hydroxy-1-piperidyliminomethyl)-5-nitroimidazole

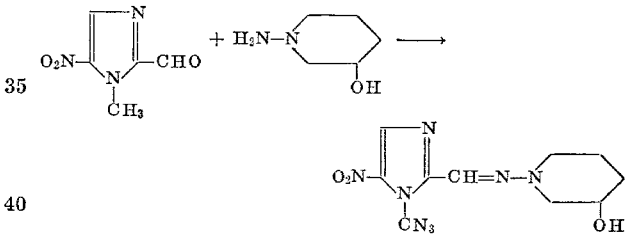

To a hot mixture of 310 mg. of 1-methyl-2-formyl-5-nitroimidazole (2 mmol) and 250 mg. of 1-amino-3-hydroxypiperidine (2.16 mmol) in 4 ml. of ethanol there is added a catalytic amount (about one drop) of 2.5 N hydrochloric acid and the solution allowed to stand for two days at room temeprature. During this time a crystalline orange precipitate forms. It is filtered off and washed with about 2 ml. of ethanol, and dried to give 301 mg. of 1-methyl - 2-(3-hydroxy-1-piperidyliminomethyl)-5-nitroimidazole, M.P. 130–135° C. A second crystal form appears at the melting point which melts at about 150° C. (dec.).

Example 14

1-methyl-2-formyl-5-nitroimidazole phenylhydrazone.— 775 mg. of 1-methyl-2-formyl-5-nitroimidazole is added to 10 ml. of ethanol and the mixture warmed to obtain solution. 750 mg. (0.7 ml.) of phenylhydrazine and 4 drops of glacial acetic acid are added to the alcohol solution. The mixture is allowed to stand for 2–3 minutes during which time the phenylhydrazone crystallizes. The reaction mixture is chilled and the solid product removed by filtration and washed with cold ethanol. It is recrystallized from about 150 ml. of ethanol to give 1-methyl-2-formyl-5-nitroimidazole phenylhydrazone, M.P. 225° C.

Example 15

(A) 2 - (1-methyl-5-nitro-2-imidazolylmethylene)-hydrazino acetamide.—770 mg. of ethyl hydrazino acetate hydrochloride is added to 8 ml. of concentrated ammonium hydroxide and the resulting solution allowed to stand at room temperature for 30 minutes during which time nitrogen is bubbled slowly through the solution. The mixture is then filtered to remove insoluble material and to the filtrate containing hydrazino acetamide there is added a warm solution of 700 mg. of 1-methyl-2-formyl-5-nitroimidazole in 10 ml. of ethanol. The resulting solution is adjusted to pH 5 with addition of about 2 ml. of glacial acetic acid. The solution is then cooled and scratched to produce a solid crystalline product. This product is removed by filtration, washed with 1:1 ethanol-water and dried to give 2-(1-methyl-5-nitro-2-imidazolylmethylene)-hydrazinoacetamide of the formula

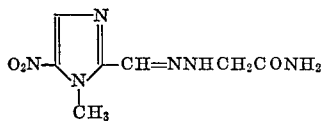

M.P. 193–198° C. Further recrystallization from about 45 ml. of nitromethane raises the M.P. to 215° C.

(B) 2 - [1 - acetyl - 2-(1-methyl-5-nitro-2-imidazolylmethylene) - hydrazino] - acetamide.—200 mg. of 2-(1-methyl - 5 - nitro-2-imidazolylmethylene)-hydrazino acetamide obtained as in part A above is added to 2 ml. of acetic anhydride. The resulting mixture is refluxed for 15 minutes and allowed to cool to room temperature. On scratching the solution, 2-[1-acetyl-2-(1-methyl-5-nitro-2 - imidazolylmethylene) - hydrazino]-acetamide of the formula

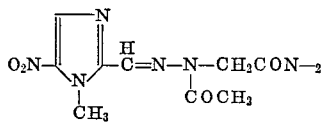

crystallizes. The mixtures is allowed to stand at room temperature for about 90 minutes and the solid product is removed by filtration, washed with ether and dried, M.P. 222–224° C. On recrystallization from 4 ml. of nitromethane the product has an M.P. of 227° C.

Example 16

3-[(1-methyl-5-nitro-2-imidazolylmethylene)-amino)]-2-oxazolidinone

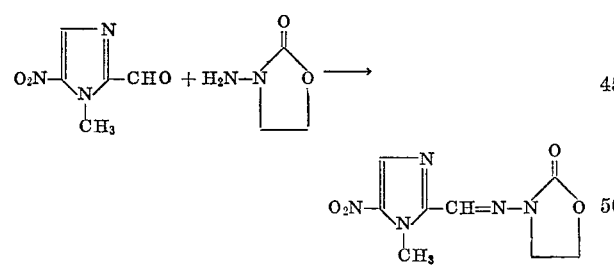

159 mg. (1.025 mmol) of 1-methyl-2-formyl-5-nitroimidazole is dissolved in 4 ml. of hot ethanol. This solution is added to 113 mg. (1.11 mmol) of 3-amino-2-oxazolidinone in 1 ml. of hot ethanol. Three drops of 2.5 N hydrochloric acid is added; an immediate crystalline precipitate forms. The solid is filtered off, washed with ethanol and dried to give 190 mg. of 3-[(1-methyl-5-nitro-2-imidazolylmethylene)-amino]-2-oxazolidinone. It is recrystallized from ethyl acetate to give substantially pure product, M.P. 247–252° C. (dec.).

Example 17

To a solution of 0.168 gm. of 1-methyl-2-acetyl-5-nitroimidazole in a minimum volume of hot methanol there is added, with stirring, a solution of 0.11 gm. of 3-amino-2-oxazolidinone in the minimum volume of hot methanol and 1 ml. of 2.5 N hydrochloric acid. The reaction mixture is allowed to cool slowly to room temperature and then chliled in an ice bath. 3-[(1-methyl-5-nitro - 2-imidazolylethylene)-amino]-2-oxazolidinone of the structure

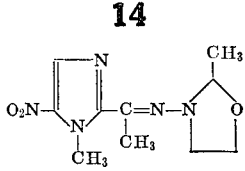

crystallizes and is filtered off. It is recrystallized from dimethylformamide-ethanol to give product melting at 183–185° C.

Example 18

3-[(1-methyl-5-nitro-2-imidazolylmethylene)-amino]-2-imidazolidinone

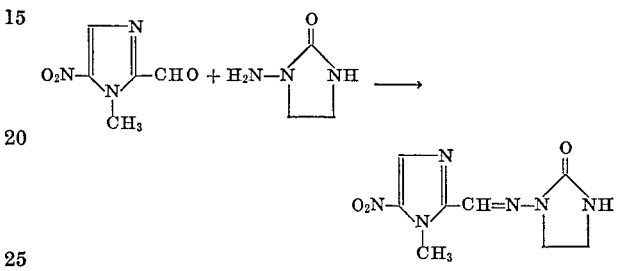

To a cold mixture of 86 mg. of 2-imidazolidone in 3 ml. of 2 N sulfuric acid there is added slowly with stirring 69 mg. of sodium nitrile in a minimum volume of water. The mixture is stirred for about 30 minutes in an ice bath and then 140 mg. of zinc dust is added in portions over a period of about 10 minutes. On completion of the zinc addition the reaction mass is stirred in an ice bath for 10 minutes and at room temperature for 15 minutes. The unreacted zinc is removed by filtration and to the filtrate containing 3-amino-2-imidazolidinone there is added 140 mg. of 1-methyl-2-formyl-5-nitro-imidazole and 3 ml. of warm ethanol. A yellow precipitate forms. The mixture is cooled and the solid removed by filtration, washed with cold ethanol and dried to give 3-[(1-methyl-5-nitro-2-imidazolylmethylene)-amino] - 2 - imidazolidinone, M.P. 303° C. (dec.).

Example 19

3-[(1-methyl-5-nitro-2-imidazolymethylene)-amino]-2,5-imidazolidindione

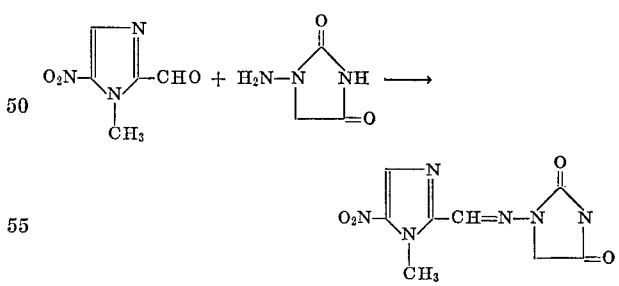

150 mg. of ethyl hydrazinoacetate hydrochloride and 100 mg. of potassium cyanate are added to 1 ml. of water and the solution allowed to stand at room temperature for about 10 minutes. At the end of this time 2 ml. of 6 N hydrochloric acid is added and the solution heated on a steam bath for 30 minutes. It is then cooled to about room temperature.

To this solution containing 3-amino-2,5-imidazolidindione there is added 140 mg. of 1-methyl-2-formyl-5-nitroimidazole in 2 ml. of ethanol. The resulting solution is heated on a steam bath for about 2 minutes and then cooled. 10 ml. of water is added and the mixture warmed to dissolve any solid material. The warm solution is cooled slowly, with scratching, to crystallize 3-[(1-methyl-5 - nitro - 2-imidazolylmethylene)-amino]-2,5-imidazolidindione. The product is removed by filtering, washed with water and dried, M.P. 250–254° C. (dec.).

Example 20

1 - methyl-2-formyl-5-nitroimidazole semicarbazone.—78 mg. of 1 - methyl-2-formyl-5-nitroimidazole (0.50 mmol) is dissolved in about 1.5 ml. of hot ethanol and the solution treated with 0.7 ml. of hot 1:1 ethanol-water containing 58 mg. (0.53 mmol) of semicarbazide hydrochloride. A crystalline yellow precipitate forms almost immediately. After 20 minutes, the solid is recovered by filtration, washed with alcohol and dried to give 107 mg. of 1 - methyl-2-formyl-5-nitroimidazole semicarbazone, M.P. 250–255° C. (dec.).

Example 21

(A) 1-methyl-2-formyl-5-nitroimidazole-4'-methylthiosemicarbazone.—To a solution of 1 gm. of 1-methyl-2-formyl-5-nitroimidazole in about 45 ml. of ethanol there is added 0.7 gm. of 4-methylthiosemicarbazide dissolved in a minimum volume of ethanol. The resulting mixture is warmed almost to reflux and about five drops of 2.5 N hydrochloric acid are added. The resulting mixture is stirred for about 5 minutes and then allowed to cool during which time 1 - methyl-2-formyl-5-nitroimidazole-4'-methylthiosemicarbazone crystallizes. The mixture is chilled in an ice bath and the solid product recovered by filtering. It is recrystallized from 1:1 dimethylformamide-water and acetone-water to give substantially pure product, M.P. 214–217° C. (dec.).

(B) 1 - methyl - 2 - formyl-5-nitroimidazole semicarbazone.—When the procedure of part A is repeated employing 0.6 gm. of thiosemicarbazide instead of the methylthiosemicarbazide, there is obtained 1-methyl-2-formyl-5-nitroimidazole semicarbazone, M.P. 230–233° C. (dec.).

Example 22

1 - methyl-2-acetyl-5-nitroimidazole semicarbazone.—0.168 gm. (0.001 mol) of 1 - methyl-2-acetyl-5-nitroimidazole is dissolved in a minimum amount of hot methanol. This solution is stirred while 0.12 gm. (0.0012 mol) of semicarbazide hydrochloride in a minimum volume of hot methanol is added to it. The reaction mixture is allowed to cool to room temperature and then chilled in an ice bath. 1-methyl-2-acetyl-5-nitroimidazole semicarbazone crystallizes. The product is filtered off, washed with 10 ml. of water and recrystallized from dimethylformamide-ethanol. 0.187 gm. of 1 - methyl - 2 - acetyl-5-nitroimidazole semicarbazone is obtained, M.P. 253–254° C.

Example 23

1,2 - trimethylene - 5 - nitroimidazole.—1.00 gm. of 1 - (β - hydroxyethyl) - 2 - methyl - 5 - nitroimidazole (5.85 mmol) and 1.50 g. of p-toluenesulfonyl chloride (7.9 mmol) are dissolved together in 10 ml. of pyridine and the solution allowed to stand for 7 hours at room temperature. The mixture is then diluted with 50 ml. of water, cooled in ice and the resulting crystalline 1-[2-(p-toluenesulfonyloxy) - ethyl] - 2 - methyl - 5 - nitroimidazole filtered off, washed with water and air dried. 1.43 gm. of product are obtained.

1.00 gm. of 1 - [2 - (p - toluenesulfonyloxy) - ethyl]-2 - methyl - 5 - nitroimidazole (3.08 mmol) is heated for 20 minutes at 70–75° C. in 20 ml. of absolute alcohol with 344 mg. (3.08 mmol) of potassium t-butoxide. The ethanol is then evaporated off in vacuo and the residue treated with 10 ml. of water and filtered. The filtrate is extracted three times with 4 ml. portions of chloroform. The cholorform extracts are combined, dried over sodium sulfate and finally evaporated to dryness to give 418 mg. of pale brown oil which crystallizes on scratching. This crude product is dissolved in 1:1 ether-hexane and filtered through 5.0 gm. of the basic alumina. The alumina is eluted with 1:1 ether-hexane and this eluate evaporated to dryness in vacuo to give 336 mg. of crystalline 1,2-trimethylene - 5 - nitroimidazole. The product is recrystallized from ether-hexane to give 261 mg. of product as fine white needles, M.P. 49.5–50.5° C.

200 mg. (1.31 mmol) of 1,2-trimethylene - 5 - nitroimidazole, 0.7 ml. of benzaldehyde and 225 mg. of potassium t-butoxide (2.0 mmol) are heated together at 70–75° C. for 20 minutes in 3.3 ml. of absolute ethanol. The mixture is then cooled in an ice bath and the solid recovered by filtration. The solid crystalline product thus obtained is washed with water and ethanol, and then recrystallized from ethanol to give 50 mg. of 3-nitro-7-benzal - 5,6 - dihydroimidazo - [1,2:a] - pyrrole, M.P. 159–161° C. Further recrystallization from ethanol raises the melting point to 165–167° C.

3-nitro-7-oxo-5,6-dihydroimidazo-[1,2:a]-pyrrole

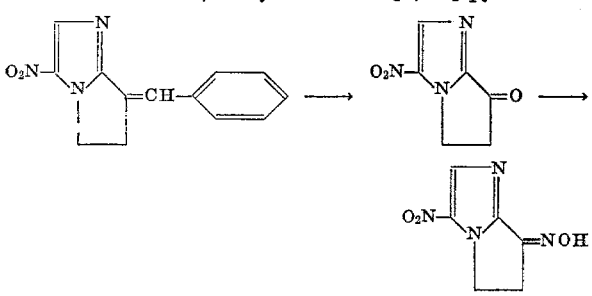

A mixture of 500 mg. of 3 - nitro - 7 - benzal - 5,6-dihydroimidazo - [1,2:a] - pyrrole (2.0 mmol), 932 mg. of sodium periodate, 15 ml. of 1,2-dimethoxyethane, 5 ml. of water and 19 mg. of osmium tetroxide is stirred at room temperature for 3½ hours. An equal volume of methylene chloride is then added and the mixture filtered. The filtrate is washed with water and evaporated to a residue containing 3 - nitro - 7 - oxo - 5,6 - dihydroimidazo - [1,2:a] - pyrrole. The residue is dissolved in ethanol and treated with excess solid hydroxylamine hydrochloride. The crystalline product precipitates (99 mg.), is recovered by filtration and recrystallized from ethanol to give 3 - nitro - 7 - oxo - 5,6 - dihydroimidazo-[1,2:a]-pyrrole, M.P. 238–250° C. (dec.).

(B) 3 - nitro - 7 - oxo - 5,6 - dihydroimidazo-[1,2:a]-pyrrole semicarbazone.—3.59 mmole of the residue containing 3-nitro - 7 - oxo - 5,6 - dihydroimidazo-[1,2:a]-pyrrole (obtained as in Part A above) is dissolved in a minimum volume of hot ethanol, and to this solution is added 3.59 mmole of semicarbazide hydrochloride in a minimum volume of aqueous ethanol. The mixture is stirred at about 60° C. for five minutes, then cooled. The solid 3 - nitro - 7 - oxo - 5,6 - dihydroimidazo - [1,2:a]-pyrrole semicarbazone is removed by filtration, and recrystallized three times from ethanol to give substantially pure meaterial, M.P. 219–222° C.

Example 24

(A) 1 - methyl - 2 - (1 - hydroxyethyl) - 5 - nitroimidazole.—A solution of methyl magnesium iodide is prepared from 4.5 gm. of magnesium, 26.3 gm. of methyl iodide and 90 ml. of diethyl ether. 2.8 mg. of this solution is diluted with 15 ml. of ether, and added to a solution of 0.5 gm. of 1-methyl - 2 - formly - 5 - nitroimidazole in 20 ml. of diethyl ether. The mixture is refluxed for 20 minutes. An additional 15 ml. of diethyl ether is then added, followed by 6.7 ml. of 0.5 N hydrochloric acid. The organic phase is separated, dried over sodium sulfate and evaporated to dryness in vacuo to give 0.27 g. of 1 - methyl - 2 - (1-hydroxyethyl)-5-nitroimidazole. This material is dissolved in ether, an equal volume of petroleum ether added, and the resulting solution evaporated to give crystalline 1-methyl - 2 - (1-hydroxyethyl)-5-nitroimidazole.

The acidic aqueous layer is extracted with an equal volume of methylene chloride. The methylene chloride solution is evaporated to a residue which is dissolved in a minimum volume of methylene chloride. One-half volume of petroleum ether is added and the solution evaporated to give a residue of 1-methyl-2-(1-hydroxyethyl)-5-nitroimidazole.

The solid products obtained are combined and dissolved in ethyl acetate. The solution is filtered through acid-washed alumina, and the filtrate evaporated to a small volume. 1-methyl-2-(1-hydroxyethyl) - 5 - nitroimidazole crystallizes, M.P. 144–145° C. It is recrystallized from ethyl acetate to give pure 1-methyl-2-(1-hydroxyethyl)-5-nitroimidazole, M.P. 145–147° C.

(B) 1-methyl-2-acetyl-5-nitroimidazole.—0.05 gm. of 1-methyl-2-(1-hydroxyethyl)-5-nitroimidazole is dissolved in 0.1 ml. of acetone and cooled to 5° C. A cold solution of 0.072 gm. of chromium trioxide in 0.17 ml. of water and 0.045 ml. of concentrated sulfuric acid is added slowly with cooling. After 30 minutes the mixture is diluted with 2 ml. of water and extracted with 5 ml. of ether. The ether extract is evaporated to dryness and the resulting product purified by sublimation to give 1-methyl-2-acetyl-5-nitroimidazole, M.P. 104–107° C.

Example 25

A solution of 1 gm. of 1-methyl-5-nitroimidazole-2-carboxylhydrazine in 75 ml. of warm ethanol is added to a solution of 860 mg. of 1-methyl-2-formyl-5-nitroimidazole in 20 ml. of ethanol. The mixture is stirred for 10 minutes then made acid with 2.5 N hydrochloric acid and chilled in an ice bath. The substituted hydrazine of the formula

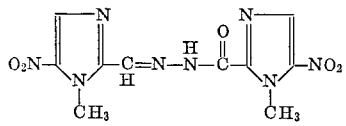

crystallizes. It is removed by filtration and recrystallized from aqueous dimethylformamide to give product having a melting point of 274–276° C.

Methods for making 1-methyl - 2 - hydroxymethyl-5-nitroimidazole, 1,2 - dimethyl-5-nitroimidazole and 1-(2-hydroxyethyl) - 2 - methyl - 5 - nitroimidazole are described in the literature. Compounds having lower alkyl groups at the 1-position are made via these procedures using the appropriate alkylating agents. The 1-(2-hydroxyethyl) and 1-(2-acyloxyethyl) - 2 - hydroxymethyl-5-nitroimidazoles, which are also used as starting materials for certain processes of the invention are prepared by the method set forth below, using if desired a different acyloxyethyl derivative in place of the acetoxyethyl compound.

1.4 g. of 1-(β-acetoxyethyl) - 5 - nitroimidazole, 1.05 g. of paraformaldehyde and 5 ml. of dimethylsulfoxide are placed in a glass tube. The tube is sealed and heated at 110° C. for 24 hours. The mixture is then removed and concentrated to dryness in vacuo. The residue is extracted with 5 ml. of hot hexane. The hexane-insoluble material is dissolved in about 10 ml. of benzene. The benzene solution is concentrated to about a 5 ml. volume, and hexane added slowly to induce crystallization of 1-(β-acetoxyethyl) - 2 - hydroxymethyl - 5 - nitroimidazole. The product thus obtained is recovered by filtration and air dried, M.P. 88–90° C. Yield: 81% of theoretical.

1-(β-hydroxyethyl) - 2 - hydroxymethyl - 5 - nitroimidazole is obtained by repeating the above experiment and using as starting material 1-(β-hydroxyethyl)-5-nitroimidazole.

Any departure from the above description which conforms to the present invention is intended to be included within the scope of the claims.

What is claimed is:
1. A compound having the formula

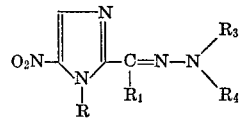

where R is selected from the class consisting of loweralkyl and —$(CH_2)_nOY$, wherein $n$ has a value of 2–4 inclusive and Y is selected from the class consisting of hydrogen, lower alkanoyl and p-toluenesulfonyl; $R_1$ is selected from the class consisting of hydrogen, phenyl, and loweralkyl; and

represents a saturated heterocyclic ring selected from the class consisting of the oxazolidine, imidazolidine, piperidine, piperazine, morpholine, and thiamorpholine rings.

2. 3-[(1-methyl - 5 - nitro - 2 - imidazolylmethylene)-amino]-2-oxazolidinone.

3. 3-[(1-methyl - 5 - nitro - 2 - imidazolylmethylene)-amino]-2-imidazolidinone.

4. 3-[(1-methyl - 5 - nitro - 2 - imidazolylmethylene)-amino]-2,5-imidazolidindione.

5. A compound having the formula

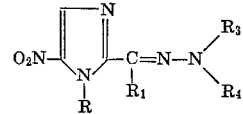

where R is selected from the class consisting of loweralkyl and —$(CH_2)_nCY$, wherein $n$ has a value of 2–4 inclusive and Y is selected from the class consisting of hydrogen, lower alkanoyl and p-toluenesulfonyl; and $R_1$ is selected from the class consisting of hydrogen, phenyl, and loweralkyl; $R_3$ is selected from the class consisting of hydrogen and lower alkanoyl; and $R_4$ is selected from the class consisting of loweralkyl, phenyl, nitrophenyl, pyridyl, picolinyl, thiazolyl, furyl, thienyl, lower alkanoyl, benzoyl, furoyl, thenoyl, pyrazinoyl, thiazole carbonyl, imidazole carbonyl, amidoloweralkyl and carboalkoxy.

6. 1-methyl-2-formyl-5-nitroimidazole N-acetyl hydrazone.

7. 2-[1-acetyl - 2 - (1 - methyl - 5 - nitro-2-imidazolylmethylene)-hydrazine]-acetamide.

References Cited

UNITED STATES PATENTS 3,472,864  10/1969  Henry et al. _____ 260—309
3,515,728   6/1970  Henry et al. _____ 260—309

OTHER REFERENCES

Chemical Abstracts, vol. 64, cols. 2093–4 (1966); (abstract of Belgian Patent 661,262 granted Sept. 17, 1965).

Hofmann: Imidazole and Its Derivatives, part 1, pp. 55–56, Interscience Publishers, Inc., N.Y. (1953).

JOHN D. RANDOLPH, Primary Examiner

U.S. Cl. X.R.

99—4; 424—273; 260—240 F, 309